(12) United States Patent
Zheng et al.

(10) Patent No.: US 11,435,608 B2
(45) Date of Patent: Sep. 6, 2022

(54) DISPLAY SUBSTRATE AND CONTROL METHOD THEREFOR, DISPLAY PANEL AND DISPLAY DEVICE

(71) Applicants: BEIJING BOE OPTOELECTRONICS TECHNOLOGY CO., LTD., Beijing (CN); BOE Technology Group Co., Ltd., Beijing (CN)

(72) Inventors: Qi Zheng, Beijing (CN); Hongliang Yuan, Beijing (CN); Xiaojuan Wu, Beijing (CN); Yao Bl, Beijing (CN); Zhiqiang Zhao, Beijing (CN); Xuan Zhong, Beijing (CN); Zhangxiang Cheng, Beijing (CN); Jiaxing Wang, Beijing (CN); Donghua Zhang, Beijing (CN); Lanjun Guo, Beijing (CN)

(73) Assignees: BEIJING BOE OPTOELECTRONICS TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/285,482

(22) PCT Filed: Aug. 24, 2020

(86) PCT No.: PCT/CN2020/110849
§ 371 (c)(1),
(2) Date: Apr. 15, 2021

(87) PCT Pub. No.: WO2021/036997
PCT Pub. Date: Mar. 4, 2021

(65) Prior Publication Data
US 2021/0341771 A1 Nov. 4, 2021

(30) Foreign Application Priority Data
Aug. 26, 2019 (CN) .......................... 201910790910.7

(51) Int. Cl.
*G02F 1/13* (2006.01)
*G02F 1/133* (2006.01)
(Continued)

(52) U.S. Cl.
CPC ........ *G02F 1/1323* (2013.01); *G02F 1/13306* (2013.01); *G02F 1/133512* (2013.01);
(Continued)

(58) Field of Classification Search
None
See application file for complete search history.

(56) References Cited

U.S. PATENT DOCUMENTS

2002/0159016 A1* 10/2002 Nishida ............. G02F 1/134363
349/141
2011/0069090 A1 3/2011 Lee et al.
(Continued)

FOREIGN PATENT DOCUMENTS

CN 103728754 A * 4/2014
CN 103728754 A 4/2014
(Continued)

OTHER PUBLICATIONS

International Search Report for PCT/CN2020/110849 dated Nov. 27, 2020.
(Continued)

*Primary Examiner* — Shan Liu
(74) *Attorney, Agent, or Firm* — Ling Wu; Stephen Yang; Ling and Yang Intellectual Property (57) ABSTRACT

Provided are a display substrate and a control method therefor, a display panel, and a display device. The display
(Continued)

substrate is disposed in the display panel and includes a first substrate and multiple mode switching electrodes and multiple data lines disposed on the first substrate; wherein, the mode switching electrode is disposed on a side of the data line away from the first substrate and insulated from the data line, and an orthographic projection of the mode switching electrode on the first substrate covers part of an orthographic projection of the data line on the first substrate; and the mode switching electrode is configured to switch display modes of the display panel, wherein the display modes include a normal mode and a privacy mode.

20 Claims, 5 Drawing Sheets

(51) Int. Cl.
  *G02F 1/1335* (2006.01)
  *G02F 1/1343* (2006.01)
  *G02F 1/1362* (2006.01)
  *G02F 1/1345* (2006.01)

(52) U.S. Cl.
  CPC .. *G02F 1/134363* (2013.01); *G02F 1/136286* (2013.01); *G02F 1/13439* (2013.01); *G02F 1/13452* (2013.01); *G02F 2201/05* (2013.01); *G02F 2201/128* (2013.01)

(56) References Cited

U.S. PATENT DOCUMENTS

| | | |
|---|---|---|
| 2016/0012792 A1 | 1/2016 | Li et al. |
| 2016/0341987 A1* | 11/2016 | Chung .............. G02F 1/134363 |
| 2017/0166813 A1 | 6/2017 | Xie |
| 2017/0192263 A1* | 7/2017 | Jiang .................... G02F 1/1323 |
| 2019/0204675 A1 | 7/2019 | Wang et al. |
| 2019/0250442 A1 | 8/2019 | Li et al. |
| 2020/0241368 A1 | 7/2020 | Lu et al. |

FOREIGN PATENT DOCUMENTS

| | | |
|---|---|---|
| CN | 104122726 A | 10/2014 |
| CN | 104155808 A | 11/2014 |
| CN | 104932167 A | 9/2015 |
| CN | 105425480 A | 3/2016 |
| CN | 106019733 A | 10/2016 |
| CN | 108169953 A | 6/2018 |
| CN | 108196391 A | 6/2018 |
| CN | 108196406 A | 6/2018 |
| CN | 108508666 A | 9/2018 |
| CN | 108732827 A | 11/2018 |
| CN | 109541831 A | 3/2019 |
| CN | 109946860 A | 6/2019 |
| CN | 110456580 A | 11/2019 |
| JP | 2008-282059 A | 11/2008 |
| KR | 20040058841 A * | 7/2004 |

OTHER PUBLICATIONS

Office Action dated Feb. 8, 2021 for Chinese Patent Application No. 201910790910.7 and English Translation.

* cited by examiner

DISPLAY SUBSTRATE AND CONTROL METHOD THEREFOR, DISPLAY PANEL AND DISPLAY DEVICE

CROSS-REFERENCE TO RELATED APPLICATION

The present application claims the priority of Chinese Patent Application No. 201910790910.7, filed to the CNIPA on Aug. 26, 2019 and entitled "Display Substrate and Control Method Therefor, Display Panel and Display device", the content of which should be construed as being incorporated into the present application by reference.

TECHNICAL FIELD

The present disclosure relates to, but is not limited to, the field of display technology, and particularly relates to a display substrate and a control method therefor, a display panel, and a display device.

BACKGROUND

Thin Film Transistor-Liquid Crystal Display (TFT-LCD) has characteristics of small size, low power consumption and no radiation. It has developed rapidly in recent years and occupies a dominant position in the current flat panel display market. Along with social development and abundance of material conditions, while the display provides people with a lot of convenience, privacy leakage is always inevitable. In this regard, display products which may realize privacy appear in the industry.

SUMMARY

The following is a summary of the subject matter described in detail in the present disclosure. This summary is not intended to limit the protection scope of the claims.

In a first aspect, the present disclosure provides a display substrate, which is disposed in a display panel, and includes a first substrate and multiple mode switching electrodes and multiple data lines disposed on the first substrate; wherein, the mode switching electrode is disposed on a side of the data line away from the first substrate and insulated from the data line, and an orthographic projection of the mode switching electrode on the first substrate covers part of an orthographic projection of the data line on the first substrate; and the mode switching electrode is configured to switch display modes of the display panel, wherein the display modes include a normal mode and a privacy mode.

In some possible implementations, the display substrate further includes: a first electrode and a second electrode; the first electrode and the mode switching electrode are disposed on a same layer, and the second electrode is disposed on a side of the first electrode close to the first substrate; wherein, the first electrode is a slit electrode, and the second electrode is a plate electrode or a slit electrode.

In some possible implementations, the mode switching electrode includes a first edge and a second edge extending along a first direction and opposing each other, and the data line includes a third edge and a fourth edge extending along the first direction and opposing each other, wherein the first edge and the third edge are on a same side, and the second edge and the fourth edge are on a same side; a distance between an orthographic projection of the first edge on the first substrate and an orthographic projection of the third edge on the first substrate is equal to a distance between a distance between an orthographic projection of the second edge on the first substrate and an orthographic projection of the fourth edge on the first substrate, wherein the first direction is an extension direction of the data line.

In some possible implementations, the first electrode is a common electrode and the second electrode is a pixel electrode, or, the first electrode is a pixel electrode and the second electrode is a common electrode; the mode switching electrode is configured to respectively form, with the first electrode and the second electrode, turbulent electric fields which drive liquid crystal molecules to deflect under the privacy mode, and form a light leakage region on a periphery of the data line.

In some possible implementations, a length of the light leakage region along a second direction is greater than a distance between an orthographic projection of the first edge on the first substrate and an orthographic projection of the third edge on the first substrate, wherein the second direction is an arrangement direction of the data lines.

In some possible implementations, the display mode of the display panel is the normal mode when a first signal is applied to the mode switching electrode, and is the privacy mode when a second signal is applied to the mode switching electrode.

In some possible implementations, the first signal is a signal applied to a common electrode under the normal mode.

In some possible implementations, the first electrode, the second electrode and the mode switching electrode are all transparent electrodes.

In some possible implementations, multiple mode switching electrodes positioned on the display substrate are connected to each other.

In a second aspect, the present disclosure further provides a display panel, which includes a box-opposite substrate, the display substrate, and a liquid crystal layer disposed between the box-opposite substrate and the display substrate, wherein the box-opposite substrate includes a second substrate and a black matrix layer disposed on the second substrate; and an orthographic projection of the black matrix layer on the second substrate covers an orthographic projection of the data line on the second substrate.

In some possible implementations, the second substrate further includes a color filter, a planarization layer disposed on a side of the black matrix layer close to the liquid crystal layer, and an upper polarizer disposed on a side of the second substrate away from the black matrix layer; and a length $W_{BM}$ of the black matrix layer along a second direction meets $W_{BM} = W_D + 2 W_0 + 2 \tan(\arcsin(\sin A1/(n2/n1)))*(H1+H2)$; wherein, $W_D$ is a length of the data line along the second direction, $W_0$ is a length of a light leakage region along the second direction, A1 is a recognizable maximum viewing angle, n1 is an integral refractive index of the liquid crystal layer, the planarization layer, the color filter and the upper polarizer, n2 is an air refractive index, H1 is a vertical distance between a surface of the planarization layer close to the first substrate and a surface of the mode switching electrode close to the first substrate, and H2 is a thickness of the planarization layer.

In a third aspect, the present disclosure further provides a display device, which includes a printed circuit board, a privacy signal line and the display panel; the display panel includes a privacy signal line configured to provide a signal to the mode switching electrode, wherein the privacy signal line is connected to the printed circuit board.

In a fourth aspect, the present disclosure further provides a method for controlling a display substrate, which is configured to control the above display substrate, and includes: switching the display mode of the display panel by controlling a signal applied to the mode switching electrode.

In some possible implementations, switching the display mode of the display panel by controlling the signal applied to the mode switching electrode includes: switching the display mode of the display panel to a normal mode by controlling the signal applied to the mode switching electrode to be a first signal, wherein the first signal is a signal of a common electrode; and switching the display mode of the display panel to a privacy mode by controlling the signal applied to the mode switching electrode to be a second signal.

Other aspects will become apparent upon reading and understanding accompanying drawings and the detailed description.

BRIEF DESCRIPTION OF DRAWINGS

Accompanying drawings are used to provide an understanding of technical solutions of the present disclosure and form a part of the description. Together with embodiments of the present disclosure, they are used to explain the technical solutions of the present disclosure and do not constitute a limitation on the solutions of the present disclosure.

DETAILED DESCRIPTION

Hereinafter embodiments of the present disclosure will be described in detail with reference to the accompanying drawings. The embodiments and features in the embodiments in the present disclosure may be combined arbitrarily if there is no conflict.

Multiple embodiments are described in the present disclosure, but the description is exemplary rather than limiting, and for those of ordinary skills in the art, there may be more embodiments and implementation solutions within the scope of the embodiments described in the present disclosure. Although many possible combinations of features are shown in the drawings and discussed in the detailed description, many other combination modes of the disclosed features are also possible. Unless specifically limited, any feature or element of any embodiment may be used in combination with or in place of any other feature or element of any other embodiment.

The present disclosure includes and contemplates combinations of features and elements known to those of ordinary skilled in the art. The disclosed embodiments, features and elements of the present disclosure may also be combined with any regular features or elements to form a technical solution defined by the claims. Any feature or element of any embodiment may also be combined with features or elements from another technical solution to form another technical solution defined by the claims. Therefore, it should be understood that any of the illustrated features in the present disclosure may be implemented individually or in any suitable combination. Therefore, the embodiments are not otherwise limited except in accordance with the appended claims and equivalents thereof. In addition, various modifications and changes may be made within the protection scope of the appended claims.

Unless otherwise defined, technical terms or scientific terms used in the present disclosure shall have ordinary meanings understood by those of ordinary skills in the field to which the present disclosure belongs. The words "first", "second" and the like used in the present disclosure do not indicate any order, quantity or importance, but are only used to distinguish different components. Similar words such as "including" or "containing" mean that elements or articles appearing before the word cover elements or articles listed after the word and their equivalents, without excluding other elements or articles. Similar words such as "connect" or "link" are not limited to physical or mechanical connections, but may include electrical connections, whether direct or indirect. "Up", "down", "left", "right" are only used to represent a relative position relationship that may change accordingly when an absolute position of a described object changes.

Generally speaking, display products which realize privacy not only cost more, but have more complex manufacturing processes.

Figure 1:
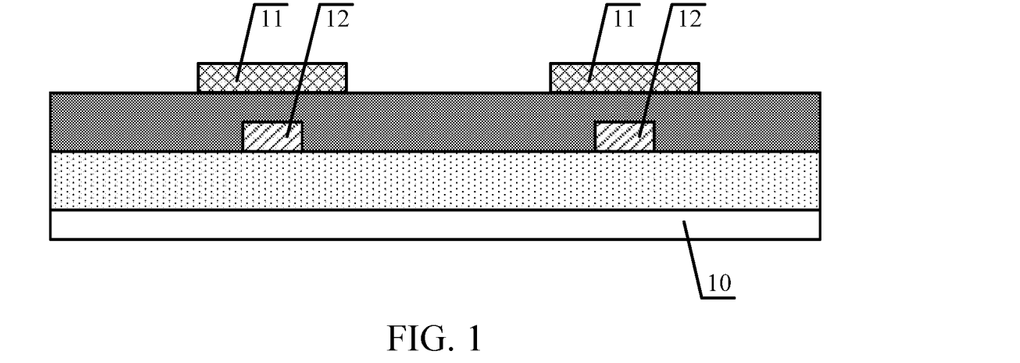
FIG. 1 is a schematic diagram of a structure of a display substrate according to an embodiment of the present disclosure.

FIG. 1 is a schematic diagram of a structure of a display substrate according to an embodiment of the present disclosure. As shown in FIG. 1, a display substrate according to an embodiment of the present disclosure includes a first substrate 10, and multiple mode switching electrodes 11 and multiple data lines 12 disposed on the first substrate 10.

The mode switching electrode 11 is disposed on a side of the data line 12 away from the first substrate 10 and insulated from the data line 12, wherein an orthographic projection of the mode switching electrode 11 on the first substrate 10 covers part of an orthographic projection of the data line 12 on the first substrate 10.

In an exemplary embodiment, multiple mode switching electrodes may be disposed along an array, and a quantity of columns of the mode switching electrodes is equal to a quantity of columns of the data lines.

In an exemplary embodiment, the display substrate may further include multiple pixel units, wherein the mode switching electrode is disposed between adjacent pixel units.

In an exemplary embodiment, a first substrate 10 may be a rigid substrate or a flexible substrate. Herein, the rigid substrate may be made of, but is not limited to, one or more of glass and metal foil sheet. The flexible substrate may be made of, but is not limited to, one or more of polyethylene terephthalate, ethylene terephthalate, polyether ether ketone, polystyrene, polycarbonate, polyarylate, polyarylester, polyimide, polyvinyl chloride, polyethylene, or textile fibers.

In an exemplary embodiment, the display panel may be a liquid crystal display panel. The display mode of the display panel may be Advanced Super Dimension Switch (ADS). Herein, the display panel of ADS mode forms a multi-dimensional electric field through an electric field generated by an edge of a slit electrode in a same plane and an electric field generated between the slit electrode layer and a plate electrode layer, so that all oriented liquid crystal molecules between slit electrodes within the liquid crystal box and directly above the electrodes may produce rotation, thereby improving working efficiency of the liquid crystal and increasing light transmission efficiency, and it has advantages of high resolution, high transmissivity, low power consumption, wide visual angle, high aperture ratio, low chromatic aberration and no squeezing water ripples.

In an exemplary embodiment, the mode switching electrode may be of any shape, which is not limited by the embodiments of the present disclosure.

In an exemplary embodiment, the mode switching electrode 11 may be a transparent electrode. The mode switching electrode 11 being the transparent electrode may not affect aperture ratio and transmissivity of the display substrate.

The mode switching electrode 11 may be made of a mask plate, which not only reduces product cost, but also simplifies manufacturing process.

In an exemplary embodiment, a manufacturing material of the mode switching electrode 11 is a transparent conductive material, wherein the transparent conductive material includes indium tin oxide or zinc tin oxide.

A display substrate according to an embodiment of the present disclosure is disposed in a display panel, and includes: a first substrate and multiple mode switching electrodes and multiple data lines disposed on the first substrate; wherein, the mode switching electrode is disposed on a side of the data line away from the first substrate and insulated from the data line, wherein an orthographic projection of the mode switching electrode on the first substrate covers part of an orthographic projection of the data line on the first substrate; the mode switching electrode is configured to switch display modes of the display panel, and the display modes include a normal mode and a privacy mode. In the display substrate according to the embodiment of the present disclosure, switching of the display mode of the display panel is achieved by disposing the mode switching electrode, which may realize privacy, not only reducing product cost, but also simplifying manufacturing process.

Figure 2:
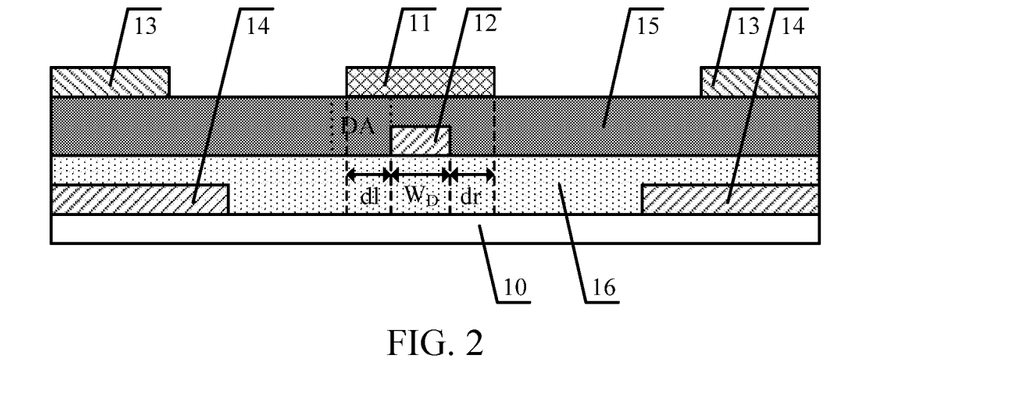
FIG. 2 is a schematic diagram of a structure of a display substrate according to an exemplary embodiment.
Figure 3:
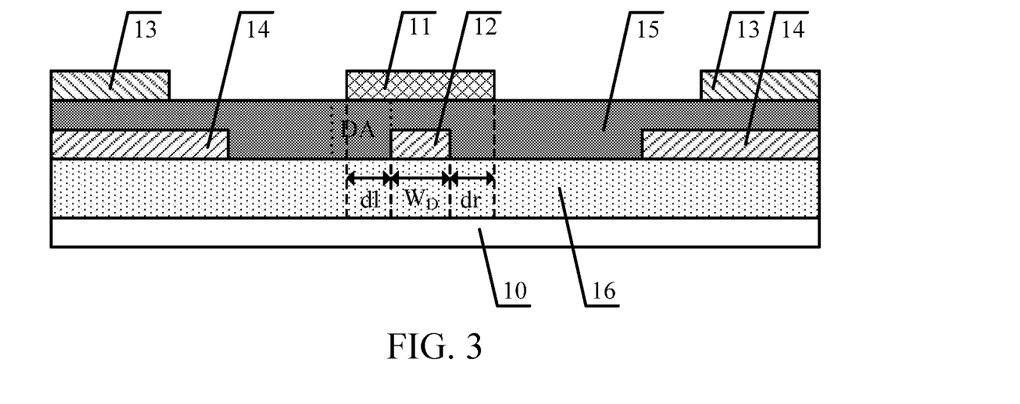
FIG. 3 is a schematic diagram of a structure of a display panel according to another exemplary embodiment.

FIG. 2 is a schematic diagram of a structure of a display substrate according to an exemplary embodiment, and FIG. 3 is a schematic diagram of a structure of a display panel according to another exemplary embodiment. As shown in FIGS. 1 to 3, the display substrate according to an exemplary embodiment further includes a first electrode 13 and a second electrode 14. The first electrode 13 is disposed in a same layer as the mode switching electrode 11, and the second electrode 14 is disposed on a side of the first electrode 13 close to the first substrate 10.

In an exemplary embodiment, the first electrode 13 may be a slit electrode.

In an exemplary embodiment, the second electrode 14 may be a plate electrode or a slit electrode.

As shown in FIGS. 2 and 3, the display substrate according to an exemplary embodiment may further include a first insulating layer 15 and a second insulating layer 16. Herein, the first insulating layer 15 is disposed between the mode switching electrode 11 and the data line 12, and the second insulating layer 16 is disposed on a side of the first insulating layer 15 close to the first substrate 10.

In an exemplary embodiment, a manufacturing material of the first insulating layer 15 and the second insulating layer 16 may be silicon oxide, silicon nitride or a composite of silicon oxide and silicon nitride.

In an exemplary embodiment, the first insulating layer 15 and the second insulating layer 16 may be of a single-layer structure, or a multi-layer structure.

In an exemplary embodiment, the display substrate may further include a thin film transistor. The thin film transistor includes an active layer, a gate electrode, a source and drain electrode, a gate insulating layer, an interlayer insulating layer and a passivation layer.

In an exemplary embodiment, the thin film transistor may be of a bottom gate structure or a top gate structure.

In an exemplary embodiment, the first insulating layer is a passivation layer of a thin film transistor. The second insulating layer may be a gate insulating layer, an interlayer insulating layer, or a gate insulating layer and an interlayer insulating layer.

In an exemplary embodiment, the data line is disposed in the same layer as a source and drain electrode of a thin film transistor.

In an exemplary embodiment, the second electrode 14 may be disposed in a same layer as the data line 12, or may be disposed on a side of the data line 12 close to the first substrate 10. Illustration is made in FIG. 2 by taking the second electrode 14 being disposed on a side of the data line 12 close to the first substrate 10 as an example, and illustration is made in FIG. 3 by taking the second electrode 14 being disposed in a same layer as a data line layer as an example.

In an exemplary embodiment, when the second electrode 14 is disposed on a side of the data line 12 close to the first substrate 10, the second electrode 14 may be disposed in a same layer as an active layer or may be disposed in a same layer as a gate electrode.

Considering process fluctuations and pixel symmetry, as shown in FIG. 2 and FIG. 3, the mode switching electrode 11 may include a first edge and a second edge extending along a first direction and opposing each other, and the data line 12 includes a third edge and a fourth edge extending along the first direction and opposing each other, wherein the first edge and third edge are on a same side, and the second edge and fourth edge are on a same side.

A distance dl between an orthographic projection of the first edge on the first substrate and an orthographic projection of the third edge on the first substrate is equal to a distance dr between an orthographic projection of the second edge on the first substrate and an orthographic projection of the fourth edge on the first substrate. Herein, the first direction is an extending direction of the data line 12.

In an exemplary embodiment, the first electrode 13 and the second electrode 14 may be configured to generate an electric field which drives liquid crystal molecules to deflect normally to realize display.

In an exemplary embodiment, when a first signal is applied to the mode switching electrode, the display mode is a normal mode, and when a second signal is applied to the mode switching electrode, the display mode is a privacy mode.

In an exemplary embodiment, the first signal may be a signal of a common electrode.

In an exemplary embodiment, as shown in FIG. 2, the first electrode 13 may be a pixel electrode and the second electrode 14 may be a common electrode. At this time, under a normal mode, a signal of the common electrode or a signal of the pixel electrode may be applied to the mode switching electrode 11. When the signal of the common electrode is applied to the mode switching electrode, since there is no voltage difference between the mode switching electrode 11 and the common electrode, and an intensity of an electric field generated between the mode switching electrode 11 and the pixel electrode has less interference with a normal display noise of the display substrate, applying the signal of the common electrode to the mode switching electrode 11 may ensure display effect of the display substrate in the normal mode. When the signal of the pixel electrode is applied to the mode switching electrode 11, a signal of a pixel electrode of a pixel adjacent to the mode switching electrode may be applied to the mode switching electrode 11. That is, when the display panel displays a monochrome screen, a signal of a same pixel electrode may be provided to different mode switching electrodes; and, when the display panel displays a color screen, signals of different pixel electrodes may be provided to different mode switching electrodes. For each pixel unit, since there is no voltage difference between the mode switching electrode 11 and a pixel electrode, an intensity of an electric field between the mode switching electrode 11 and the common electrode is the same as an intensity of an electric field between the common electrode and the pixel electrode, so applying the signal of the pixel electrode to the mode switching electrode 11 may ensure display effect of the display substrate under the normal mode.

In an exemplary embodiment, when a signal of a pixel electrode is applied to the mode switching electrode 11, a signal of a pixel electrode of any pixel adjacent to the mode switching electrode may be applied to the mode switching electrode 11.

In an exemplary embodiment, as shown in FIG. 3, the first electrode 13 may be a common electrode and the second electrode 14 may be a pixel electrode. At this time, under a normal mode, a signal of the common electrode may be applied to the mode switching electrode 11. Since there is no voltage difference between the first electrode 13 and the mode switching electrode 11, and an intensity of an electric field generated between the mode switching electrode 11 and the second electrode 14 is the same as an intensity of an electric field between the first electrode 13 and the second electrode 14, applying the signal of the common electrode to the mode switching electrode 11 may ensure display effect of the display substrate in the normal mode. As a part of the first electrode 13, the mode switching electrode 11 forms, with the second electrode 14, an electric field which drives liquid crystal molecules to deflect normally.

In an exemplary embodiment, the mode switching electrode 11 is configured to respectively form, with the first electrode 13 and the second electrode 14, turbulent electric fields which drive liquid crystal molecules to deflect under a privacy mode, and form a light leakage region DA on a periphery of the data line 12.

As shown in FIGS. 2 and 3, a length of a light leakage region DA along a second direction is larger than a distance dl between an orthographic projection of the first edge on the first substrate 10 and an orthographic projection of the third edge on the first substrate 10, that is, an orthographic projection of the mode switching electrode 11 on the first substrate 10 does not cover an orthographic projection of the light leakage region DA on the first substrate 10. Herein, the second direction is an arrangement direction of the data lines.

In an exemplary embodiment, an orthographic projection of the data line 12 on the first substrate 10 does not overlap with an orthographic projection of a light leakage region DA on the first substrate 10.

In an exemplary embodiment, the first electrode 13 and the second electrode 14 may be transparent electrodes. The first electrode 13 and the second electrode 14 being the transparent electrodes may not affect aperture ratio and transmissivity of the display substrate.

In an exemplary embodiment, a manufacturing material of a transparent electrode may be indium tin oxide or zinc tin oxide.

In an exemplary embodiment, under a privacy mode, through applying a second signal to the mode switching electrode 11, so as to respectively form, by the mode switching electrode 11 with the first electrode 13 and the second electrode 14, turbulent electric fields which drive liquid crystal molecules to deflect, and form a light leakage area DA on a periphery of the data line 12, a light leakage occurs in the display substrate, and a contrast of a display content viewed by an observer positioned at a side visual angle is reduced, so that an observer viewing the display substrate from the side visual angle cannot see an image clearly, which may realize privacy.

In an exemplary embodiment, contrasts of a display content seen by an observer when positioned at different viewing angles are different.

In an exemplary embodiment, signals applied to the mode switching electrode 11 are different, and ranges of a formed light leakage region DA are different. Herein, the larger a voltage difference between a voltage of a signal applied to the mode switching electrode 11 and a voltage of a signal applied to a common electrode, the larger the range of the formed light leakage region DA is. When the first electrode is a common electrode and the second electrode is a pixel electrode, the larger a voltage difference between a voltage of a signal applied to the mode switching electrode 11 and a voltage of a signal applied to the first electrode 13, the larger the range of the formed light leakage region DA is. When the first electrode 13 is a pixel electrode and the second electrode 14 is a common electrode, the larger a voltage difference between a voltage of a signal applied to the mode switching electrode 11 and a voltage of a signal applied to the second electrode 14, the larger the range of the formed light leakage region DA is.

In an exemplary embodiment, values of voltages of the first signal and the second signal are determined according to values of voltages of signals applied by the first electrode and the second electrode.

In an exemplary embodiment, a value of a voltage of the second signal may be higher or lower than that of the first signal.

When the first electrode 13 is a common electrode and the second electrode 14 is a pixel electrode, under a normal mode, a signal of the common electrode is provided to the mode switching electrode 11. At this time, a voltage difference between the mode switching electrode 11 and the first electrode 13 is equal to 0. Under a privacy mode, the voltage difference between the mode switching electrode 11 and the first electrode 13 is not equal to 0, that is, an absolute value of a difference between a voltage difference between the mode switching electrode 11 and the second electrode 14 and a voltage difference between the first electrode 13 and the second electrode 14 is not equal to 0. The smaller the voltage difference between the mode switching electrode 11 and the first electrode 13, the greater the difference between the voltage difference between the mode switching electrode 11 and the second electrode 14 and the voltage difference between the first electrode 13 and the second electrode 14 is. On the contrary, the greater a difference between a value of a voltage of a signal of the mode switching electrode 11 and a value of a voltage of a signal of the first electrode 13, the greater the difference between the voltage difference between the mode switching electrode 11 and the second electrode 14 and the voltage difference between the first electrode 13 and the second electrode 14 is. The greater the voltage difference between the mode switching electrode 11 and the first electrode 13, the more turbulent turbulent electric fields respectively formed by the mode switching electrode 11 with the first electrode 13 and the second electrode 14 are, and the greater a range of a light leakage region in the display substrate is, that is, a light leakage of the display substrate is more serious and a contrast of a display content viewed by an observer positioned at a side visual angle is reduced, so that an observer viewing the display substrate from the side visual angle cannot see an image clearly, a privacy performance being better. Due to shielding of a black matrix layer in a box-opposite substrate disposed on the display substrate, an observer positioned at a front visual angle will not be affected by a light leakage in the light leakage region, and a normal display may not be affected.

In an exemplary embodiment, under a privacy mode, contrasts of a display content viewed from different side visual angles are different, that is, an attenuation degree of the contrast is also related to a viewed viewing angle.

When the first electrode 13 is a pixel electrode and the second electrode 14 is a common electrode, under a normal mode, a signal of the common electrode is provided to the mode switching electrode 11, at which time, a voltage difference between the mode switching electrode 11 and the second electrode 14 is equal to 0; and under a privacy mode, the voltage difference between the mode switching electrode 11 and the second electrode 14 is not equal to 0, that is, a difference between a voltage difference between the mode switching electrode 11 and the second electrode 13 and a voltage difference between the first electrode 13 and the second electrode 14 is not equal to 0. The smaller the voltage difference between the mode switching electrode 11 and the second electrode 14, the greater the difference between the voltage difference between the mode switching electrode 11 and the first electrode 13 and the voltage difference between the first electrode 13 and the second electrode 14 is. On the contrary, the greater a difference between a value of a voltage of a signal of the mode switching electrode 11 and a value of a voltage of a signal of the second electrode 14, the greater the difference between the voltage difference between the mode switching electrode 11 and the first electrode 13 and the voltage difference between the first electrode 13 and the second electrode 14 is. The greater the voltage difference between the mode switching electrode 11 and the second electrode 14, the more turbulent turbulent electric fields respectively formed by the mode switching electrode 11 with the first electrode 13 and the second electrode 14 are, and the greater a range of a light leakage region in the display substrate is, that is, a light leakage of the display substrate is more serious and a contrast of a display content viewed by an observer positioned at a side visual angle is reduced, so that an observer viewing the display substrate from the side visual angle cannot see an image clearly, a privacy performance being better. Due to shielding of a black matrix layer in a box-opposite substrate disposed on the display substrate, an observer positioned at a front visual angle will not be affected by a light leakage in the light leakage region, and a normal display may not be affected.

In an exemplary embodiment, contrasts of a display content viewed from different side visual angles are different, that is, an attenuation degree of the contrast is also related to a viewed viewing angle.

In an exemplary embodiment, when the first electrode 13 in the display substrate is a common electrode and the second electrode 14 is a pixel electrode, a display mode of the display panel is switched to a privacy mode when a value of a voltage of a signal applied to the pixel electrode is 5V, a value of a voltage of a signal applied to the common electrode is 0V, and a value of a voltage of a signal applied to the mode switching electrode is 2V. At this time, a contrast of a display content observed by an observer is less than 5 when a viewing angle is greater than 40 degrees, and a contrast of a display content observed by an observer is between 20 and 50 when a viewing angle is less than 40 degrees. That is to say, under a privacy mode, a contrast of a display content observed by an observer decreases with the increase of a viewing angle. With the increase of the value of the voltage of the signal of the mode switching electrode, a voltage difference between the mode switching electrode 11 and the first electrode 13 increases, and an attenuation degree of contrasts of the display content observed by the observer at different viewing angles also increases. When the value of the voltage of the signal applied to the mode switching electrode is 0V, the display mode is switched to a normal mode. At this time, at all viewing angles, contrasts of a display content observed by an observer are all greater than 10.

Figure 4:
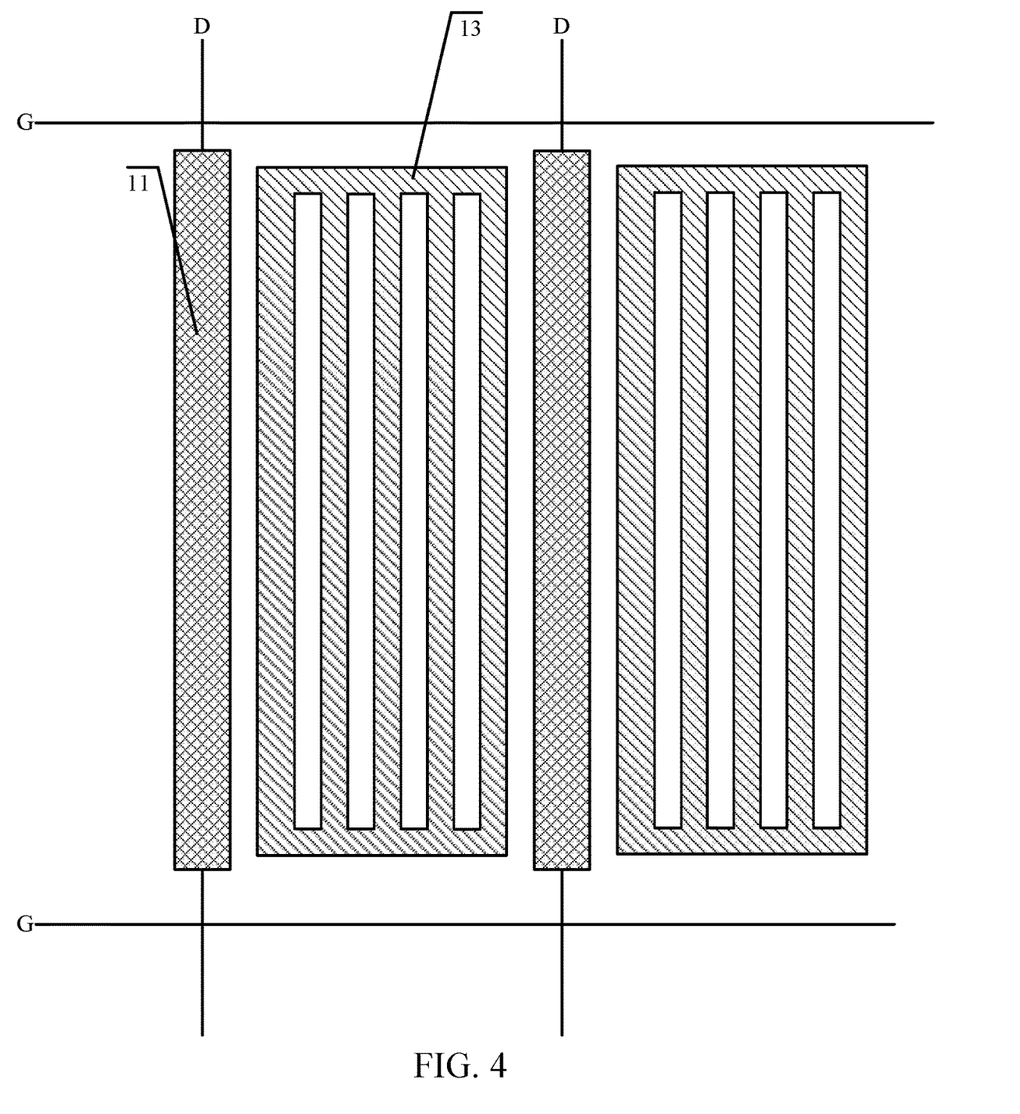
FIG. 4 is a top view of a display substrate according to an exemplary embodiment.
Figure 5:
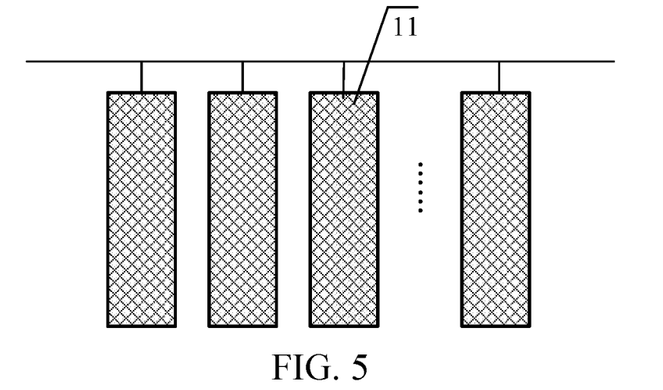
FIG. 5 is another top view of a display substrate according to an exemplary embodiment.

FIG. 4 is a top view of a display substrate according to an exemplary embodiment, and FIG. 5 is another top view of a display substrate according to an exemplary embodiment. As shown in FIG. 4, the display substrate according to an exemplary embodiment includes a gate line G and a data line D, wherein an orthographic projection of the mode switching electrodes 11 on the first substrate covers part of an orthographic projection of the data line D on the first substrate, and a quantity of the mode switching electrodes 11 is multiple. Only two mode switching electrodes 11 are shown in FIG. 4.

When a common electrode signal is provided to the mode switching electrodes, as shown in FIG. 5, multiple mode switching electrodes 11 are connected to each other in the display substrate according to an exemplary embodiment.

In an exemplary embodiment, when the first electrode is a pixel electrode and the second electrode is a common electrode, when a normal mode display is performed by providing different pixel electrode signals to different mode switching electrodes, different mode switching electrodes are respectively independent.

Figure 6:
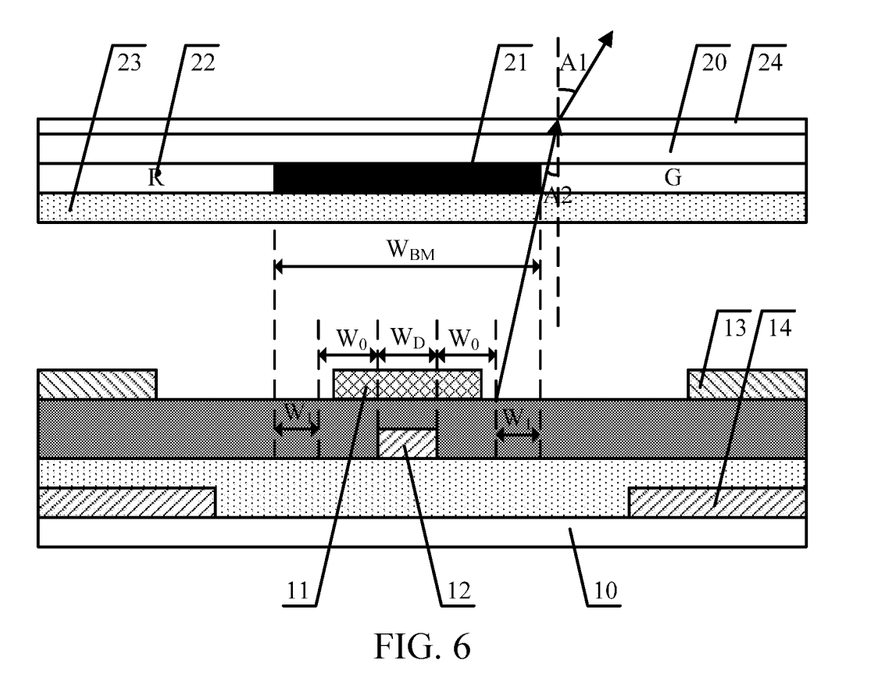
FIG. 6 is a schematic diagram of a structure of a display panel according to an embodiment of the present disclosure.
Figure 7:
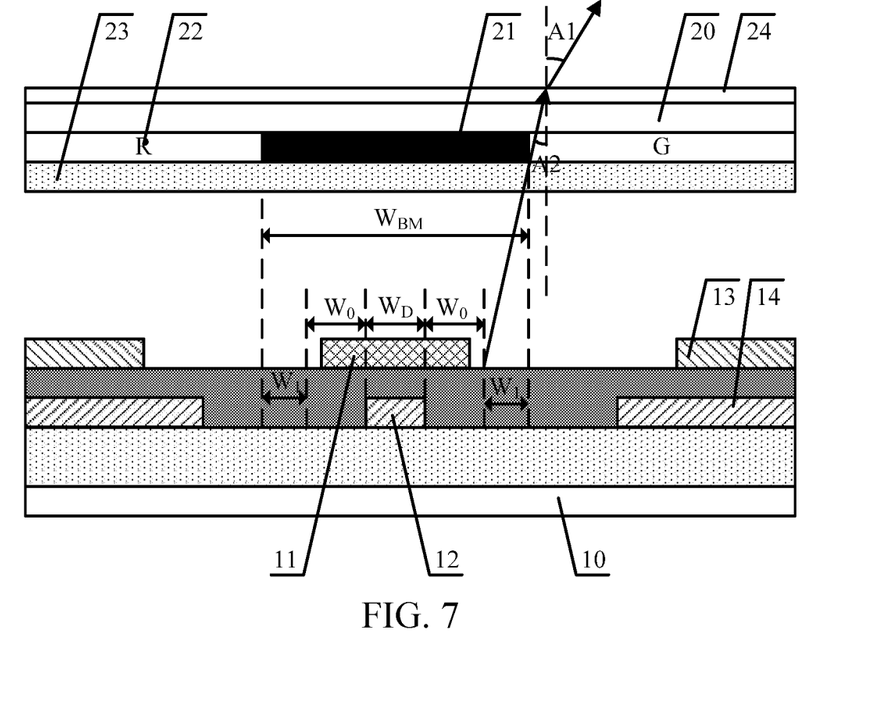
FIG. 7 is another schematic diagram of a structure of a display panel according to an embodiment of the present disclosure.

FIG. 6 is a schematic diagram of a structure of a display panel according to an embodiment of the present disclosure, and FIG. 7 is another schematic diagram of a structure of a display panel according to an embodiment of the present disclosure. As shown in FIGS. 6 and 7, a display panel provided by an embodiment of the present disclosure includes a box-opposite substrate, a display substrate, and a liquid crystal layer (not shown in the figure) between the box-opposite substrate and the display substrate. The box-opposite substrate includes a second substrate 20 and a black matrix layer 21 disposed on the second substrate 20. An orthographic projection of the black matrix layer 21 on the second substrate 20 covers an orthographic projection of the data line 12 on the second substrate 20.

In an exemplary embodiment, the liquid crystal layer includes multiple liquid crystal molecules.

In an exemplary embodiment, the second substrate 20 may be a rigid substrate or a flexible substrate. Herein, the rigid substrate may be made of, but is not limited to, one or more of glass and metal foils. The flexible substrate may be made of, but is not limited to, one or more of polyethylene terephthalate, ethylene terephthalate, polyether ether ketone, polystyrene, polycarbonate, polyarylate, polyarylester, polyimide, polyvinyl chloride, polyethylene, or textile fibers.

In an exemplary embodiment, a box-opposite substrate may further include: a color filter 22, a planarization layer 23 disposed on a side of the black matrix layer 21 close to the display substrate, and an upper polarizer 24 disposed on a side of the second substrate 20 away from the black matrix layer 21.

In an exemplary embodiment, the color filter 22 is disposed in a same layer as the black matrix layer 21, and is disposed within a pixel region, and the black matrix layer 21 is disposed between adjacent pixel regions, and is configured to shield the data line 12.

In an exemplary embodiment, a length $W_{BM}$ of the black matrix layer 21 along the second direction meets $W_{BM}=W_D+2\ W_0+2\ W_1$, where $W_1=\tan(\arcsin(\sin A1/(n2/n1)))*(H1+H2)$.

Wherein, $W_D$ is a length of the data line along the second direction, $W_0$ is a length of the light leakage region along the second direction, $W_1$ is a length of the compensation region along the second direction, and A1 is a recognizable maximum viewing angle. For convenience of calculation, n1 is an integral refractive index of the liquid crystal layer, the planarization layer, the color filter and the upper polarizer, n2 is an air refractive index, H1 is a vertical distance between a surface of the planarization layer close to the first substrate and a surface of the mode switching electrode close to the first substrate, and H2 is a thickness of the planarization layer.

Under a privacy mode, it is necessary to ensure that a contrast CR of a content displayed on the display substrate is greater than or equal to a contrast threshold when viewed from an viewing angle less than A1. Because the contrast CR of the content displayed on the display substrate needs to meet CR>L1/L2, wherein, L1 is a maximum brightness of a whole pixel region in the display substrate and L2 is a brightness at a boundary of the light leakage region specified by a user, L2 may be obtained according to CR and L1, while the boundary of the light leakage region may be determined according to L2, and the length $W_0$ of the light leakage region along the second direction may also be derived according to L2, so as to ensure that the viewing angle of the display panel may achieve a display effect required by a customer under the privacy mode.

A derivation process of the length $W_1$ of the compensation region along the second direction is as follows: in order to ensure the recognizable maximum viewing angle A1 (that is, the contrast CR of the display content is greater than or equal to the contrast threshold), the length $W_1$ of the compensation region along the second direction meets that it is ensured that an angle of light emitted due to that light emitted from the boundary of the light leakage region passes through the liquid crystal layer, the planarization layer, the color filter and the upper polarizer is A1, and A2 is a minimum incident angle that may avoid the black matrix layer BM and emit to a surface of the display panel, it may be known according to the law of refraction that:

$$\sin A1/\sin A2=n2/n1$$

Therefore, $A2=\arcsin[\sin A1/(n2/n1)]$, and it may be known from the trigonometric function that $\tan A2=W1/(H1+H2)$, then $W_1=\tan A2*(H1+H2)=\tan(\arcsin(\sin A1A1/(n2/n1)))*(H1+H2)$.

In an exemplary embodiment, an orthographic projection of the black matrix layer on the first substrate covers an orthographic projection of the light leakage region on the first substrate, which ensures that the light leakage region is shielded from the front visual angle and not from the side visual angle, thus ensuring that the observer positioned at the front visual angle may unable to see the light emitted from the light leakage region, while the observer positioned at the side visual angle then will be affected by the light emitted from the light leakage region, which may realize privacy. Herein, the front visual angle refers to an angle whose viewing angle is less than A1, and the side view angle refers to an angle whose viewing angle is greater than or equal to A1.

In order to ensure that there is no light leakage in the light within the viewing angle A1, the above derivation mode is backward pushing along an emergent light path, wherein, an orthographic projection of the black matrix layer covers not only an orthographic projection of the light leakage region but also an orthographic projection of the compensation region, so that when viewed from a certain visual angle, such as the display content is viewed at the viewing angle A1, an oblique projection along a direction of the viewing angle just covers the light leakage region, ensuring that the black matrix layer can cover the light leakage region as long as it is an viewing angle within the viewing angle A1, and ensuring that the observer at the front visual angle may watch normally under the privacy mode.

With the black matrix layer meeting the above formula, the observer positioned at the side visual angle may be affected by the light emitted from the light leakage region under the privacy mode, and the contrast of the display content observed by the observer is smaller, which may achieve a purpose of privacy. For a viewing angle smaller than the viewing angle A1, the black matrix layer covers the light leakage region, which may ensure that the display content viewed by the observer whose viewing angle is less than A1, that is, the front visual angle, will not be affected by a light leakage, the contrast of the display content observed by the observer is greater than or equal to the contrast threshold, and the display content may be observed normally. The black matrix layer meeting the above formula may weaken a negative impact on the contrast of front visual angle in this process to a certain extent, ensuring display effect of the front visual angle.

In an exemplary embodiment, the effect of privacy may be enhanced by changing a value of a voltage of a signal applied to the mode switching electrode 11.

In an exemplary embodiment, lengths of data lines along the second direction are different among different display products, so lengths of light leakage regions of the different display products along the second direction are different. For smaller display products such as mobile phones, when the length of the black matrix layer therein along the second direction is about 22 microns, it may be ensured that the light leakage region is fully covered, and for larger display products such as computers, when the length of the black matrix layer therein along the second direction is about 28 microns, it may be ensured that the light leakage region is fully covered.

The display substrate is the display substrate according to any one of the preceding embodiments, and has similar implementation principles and implementation effects, which will not be described further here.

Figure 8:
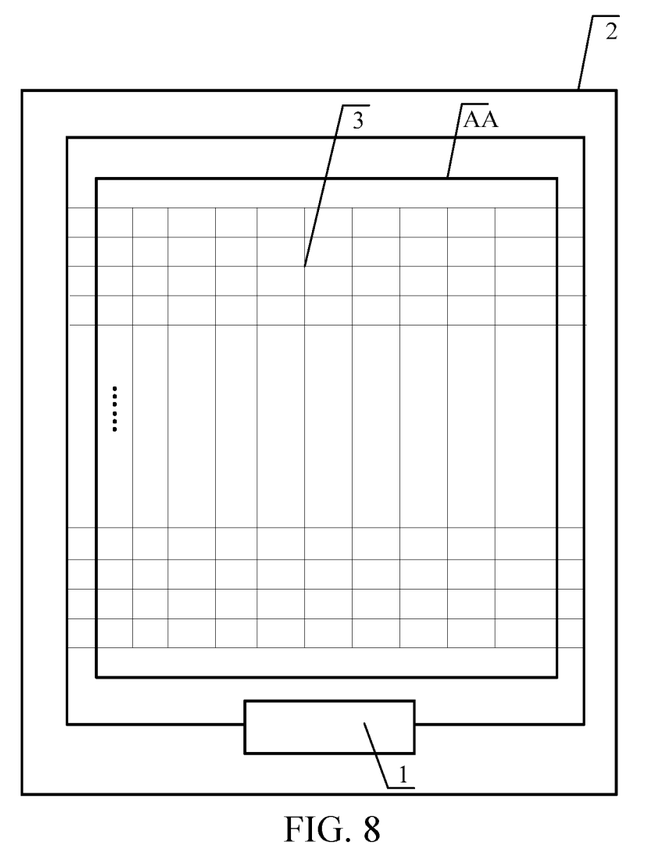
FIG. 8 is a schematic diagram of a structure of a display device according to an embodiment of the present application.

FIG. 8 is a schematic diagram of a structure a display device according to an embodiment of the present disclosure. As shown in FIG. 8, a display device according to an embodiment of the present disclosure includes a printed circuit board 1 and a display panel 2.

The display panel 2 includes a privacy signal line 3, configured to provide a signal to a mode switching electrode. The privacy signal line 3 is connected to the printed circuit board 1.

The display panel includes a display region AA and a non-display region, wherein the printed circuit board 1 is positioned in the non-display region of the display panel.

In an exemplary embodiment, the printed circuit board 1 applies different signals to the mode switching electrode 11 in different display modes, so as to achieve time-sharing power supply to the mode switching electrode 11.

In an exemplary embodiment, the privacy signal line may be disposed in a same layer as one of a gate electrode in a thin film transistor, a source electrode, a gate insulating layer, an active layer and an interlayer insulating layer.

In an exemplary embodiment, the privacy signal line may be connected to the printed circuit board through a grid line or another connection mode.

The display panel is the display panel according to any one of the preceding embodiments, and has similar implementation principles and implementation effects, which will not be described further here.

An embodiment of the present disclosure further provides a method for controlling a display substrate, which is configured to control a display substrate, and includes: a display mode is switched by controlling a signal applied to a mode switching electrode.

The display substrate is a display substrate according to any one of the preceding embodiments, and has similar implementation principles and implementation effects, which will not be described further here.

In an exemplary embodiment, the display mode of the display panel is switched by controlling the signal applied to the mode switching electrode may include: a first signal is applied to the mode switching electrode and the display mode is switched to a normal mode, or, a second signal is applied to the mode switching electrode and the display mode is switched to a privacy mode.

In an exemplary embodiment, the first signal may be a signal of a common electrode.

In an exemplary embodiment, the second signal is applied to the mode switching electrode, and the display mode is switched to the privacy mode may include: a degree of privacy in the privacy mode is adjusted by changing a size of the second signal.

The drawings in the present disclosure only involve the structures referred to in the embodiments of the present disclosure, and other structures may refer to common designs.

For the sake of clarity, the thickness and the size of layers or microstructures are exaggerated in the drawings used to describe the embodiments of the present disclosure. It may be understood that when an element such as a layer, a film, a region or a substrate is referred to as being positioned "on" or "under" another element, the element may be "directly" "on" or "under" the another element, or there may be an intervening element.

Although the embodiments disclosed in the present disclosure are as described above, the described contents are only the embodiments used for facilitating understanding of the present disclosure, which are not intended to limit the present disclosure. A person skilled in the art to which the present disclosure pertains may make any modifications and variations in the form and details of implementation without departing from the spirit and the scope disclosed in the present disclosure. Nevertheless, the scope of patent protection of the present disclosure shall still be determined by the scope defined by the appended claims.

The invention claimed is:

1. A display panel, comprising
a box-opposite substrate;
a display substrate, disposed in a display panel and comprising: a first substrate and a plurality of mode switching electrodes and a plurality of data lines disposed on the first substrate; and
a liquid crystal layer disposed between the box-opposite substrate and the display substrate;
wherein the box-opposite substrate comprises a second substrate and a black matrix layer disposed on the second substrate; and an orthographic projection of the black matrix layer on the second substrate covers an orthographic projection of the data line on the second substrate;
wherein, the mode switching electrode is disposed on a side of the data line away from the first substrate and insulated from the data line, and an orthographic projection of the mode switching electrode on the first substrate covers part of an orthographic projection of the data line on the first substrate;
wherein the mode switching electrode is configured to switch display modes of the display panel, wherein the display modes comprise a normal mode and a privacy mode;
wherein the second substrate further comprises a color filter, a planarization layer disposed on a side of the black matrix layer close to the liquid crystal layer, and an upper polarizer disposed on a side of the second substrate away from the black matrix layer; and a length $W_{BM}$ of the black matrix layer along a second direction meets $W_{BM}=WD+2\ W_0+2\ \tan\ (\sin A1\ /(n2/n1)))*(H1+H2)$;
wherein $W_D$ is a length of the data line along the second direction, $W_0$ is a length of a light leakage region along the second direction, A1 is a recognizable maximum viewing angle, n1 is an integral refractive index of the liquid crystal layer, the planarization layer, the color filter and the upper polarizer, n2 is an air refractive index, H1 is a vertical distance between a surface of the planarization layer close to the first substrate and a surface of the mode switching electrode close to the first substrate, and H2 is a thickness of the planarization layer.

2. The display paneldisplay substrate according to claim 1, wherein the display substrate further comprises: a first electrode and a second electrode; and
the first electrode and the mode switching electrode are disposed on a same layer, and the second electrode is disposed on a side of the first electrode close to the first substrate;
wherein, the first electrode is a slit electrode, and the second electrode is a plate electrode or a slit electrode.

3. The display panel according to claim 2, wherein the mode switching electrode comprises a first edge and a second edge extending along a first direction and opposing each other, and the data line comprises a third edge and a fourth edge extending along the first direction and opposing each other, wherein the first edge and the third edge are on a same side, and the second edge and the fourth edge are on a same side;
a distance between an orthographic projection of the first edge on the first substrate and an orthographic projection of the third edge on the first substrate is equal to a distance between an orthographic projection of the second edge on the first substrate and an orthographic projection of the fourth edge on the first substrate, wherein the first direction is an extension direction of the data line.

4. A method for controlling the display panel according to claim 3, and comprising:
switching a display mode of the display panel by controlling a signal applied to the mode switching electrode.

5. A display device, comprising a printed circuit board and the display panel according to claim 3; and
the display panel comprises a privacy signal line configured to provide a signal to the mode switching electrode, wherein the privacy signal line is connected to the printed circuit board.

6. The display panel according to claim 2, wherein the first electrode is a common electrode and the second electrode is a pixel electrode, or, the first electrode is a pixel electrode and the second electrode is a common electrode; and
the mode switching electrode is configured to respectively form, with the first electrode and the second electrode, turbulent electric fields which drive deflection of liquid crystal molecules under the privacy mode, and form a light leakage region on a periphery of the data line.

7. The display panel according to claim 6, wherein a length of the light leakage region along a second direction is greater than a distance between an orthographic projection of the first edge on the first substrate and an orthographic projection of the third edge on the first substrate, wherein the second direction is an arrangement direction of the data lines.

8. A method for controlling the display panel according to claim 7, and comprising:
switching a display mode of the display panel by controlling a signal applied to the mode switching electrode.

9. The display panel according to claim 6, wherein the display mode of the display panel is the normal mode when a first signal is applied to the mode switching electrode, and is the privacy mode when a second signal is applied to the mode switching electrode.

10. The display panel according to claim 9, wherein the first signal is a signal applied to a common electrode under the normal mode.

11. The display panel according to claim 9, wherein a plurality of mode switching electrodes which are positioned on the display substrate are connected to each other.

12. A method for controlling the display panel according to claim 9, and comprising:
switching a display mode of the display panel by controlling a signal applied to the mode switching electrode.

13. A method for controlling the display panel according to claim 6, and comprising:
switching a display mode of the display panel by controlling a signal applied to the mode switching electrode.

14. A display device, comprising a printed circuit board and the display panel according to claim 6; and
the display panel comprises a privacy signal line configured to provide a signal to the mode switching electrode, wherein the privacy signal line is connected to the printed circuit board.

15. The display panel according to claim 2, wherein the first electrode, the second electrode and the mode switching electrode are all transparent electrodes.

16. A display device, comprising a printed circuit board and the display panel according to claim 2; and
the display panel comprises a privacy signal line configured to provide a signal to the mode switching electrode, wherein the privacy signal line is connected to the printed circuit board.

17. A method for controlling the display panel according to claim 2, and comprising:
switching a display mode of the display panel by controlling a signal applied to the mode switching electrode.

18. A display device, comprising a printed circuit board and the display panel according to claim 1; and
the display panel comprises a privacy signal line configured to provide a signal to the mode switching electrode, wherein the privacy signal line is connected to the printed circuit board.

19. A method for controlling the display panel according to claim 1, and comprising:
switching a display mode of the display panel by controlling a signal applied to the mode switching electrode.

20. The method according to claim 19, wherein, switching the display mode of the display panel by controlling the signal applied to the mode switching electrode comprises:
switching the display mode of the display panel to a normal mode by controlling the signal applied to the mode switching electrode to be a first signal, wherein the first signal is a signal of a common electrode; and
switching the display mode of the display panel to a privacy mode by controlling the signal applied to the mode switching electrode to be a second signal.

* * * * *